United States Patent [19]

Freitag et al.

[11] 4,323,224
[45] Apr. 6, 1982

[54] GAS SPRING WITH MEANS FOR IMPEDING PISTON MOVEMENT AWAY FROM ONE TERMINAL POSITION

[75] Inventors: Herbert Freitag, Koblenz-Metternich; Klaus Schnitzius, Rheinbrohl, both of Fed. Rep. of Germany

[73] Assignee: Stabilus GmbH, Koblenz-Neuendorf, Fed. Rep. of Germany

[21] Appl. No.: 55,826

[22] Filed: Jul. 9, 1979

Related U.S. Application Data

[60] Continuation-in-part of Ser. No. 938,228, Aug. 30, 1978, abandoned, which is a division of Ser. No. 791,011, Apr. 26, 1977, Pat. No. 4,166,612.

[30] Foreign Application Priority Data

Apr. 30, 1976 [DE] Fed. Rep. of Germany ....... 2619176

[51] Int. Cl.³ .............................................. F16F 9/10
[52] U.S. Cl. .................................. 267/64.12; 188/317; 267/64.15; 267/120; 267/124
[58] Field of Search ................... 267/65 R, 64 R, 120, 267/124, 8 R, 64.12, 64.15, 64.22, 64.11; 188/269, 282, 288, 300, 316, 317, 284; 200/61.62

[56] References Cited

U.S. PATENT DOCUMENTS

| | | | |
|---|---|---|---|
| 2,920,338 | 1/1960 | Falk | 188/300 X |
| 3,150,747 | 9/1964 | Bliven et al. | 188/300 |
| 3,625,320 | 12/1971 | Doetsch et al. | 188/284 X |
| 3,919,509 | 11/1975 | Schnitzius | 200/61.62 |
| 3,963,227 | 6/1976 | Mölders | 267/120 |
| 4,113,071 | 9/1978 | Müller et al. | 188/282 |
| 4,156,523 | 5/1979 | Bauer | 267/120 |

FOREIGN PATENT DOCUMENTS

| | | |
|---|---|---|
| 1385007 | 2/1964 | France . |
| 2279981 | 2/1976 | France . |
| 1022489 | 3/1966 | United Kingdom . |

*Primary Examiner*—Douglas C. Butler
*Attorney, Agent, or Firm*—Brumbaugh, Graves, Donohue & Raymond

[57] ABSTRACT

A gas spring of the piston-and-cylinder type in which the two compartments of the cylinder cavity, separated by a piston assembly, are connected by a first passage. A valve arrangement on the piston assembly defines a second passage between the compartments and closes in response to movement of the piston assembly away from a terminal position in the cylinder while opening in response to movement of the piston assembly towards the terminal position. Releasable locking structure carried in part by the cylinder and in part by the piston assembly cooperates to close the first passage when the piston assembly approaches the terminal position, thereby to hold the piston assembly in such terminal position.

18 Claims, 4 Drawing Figures

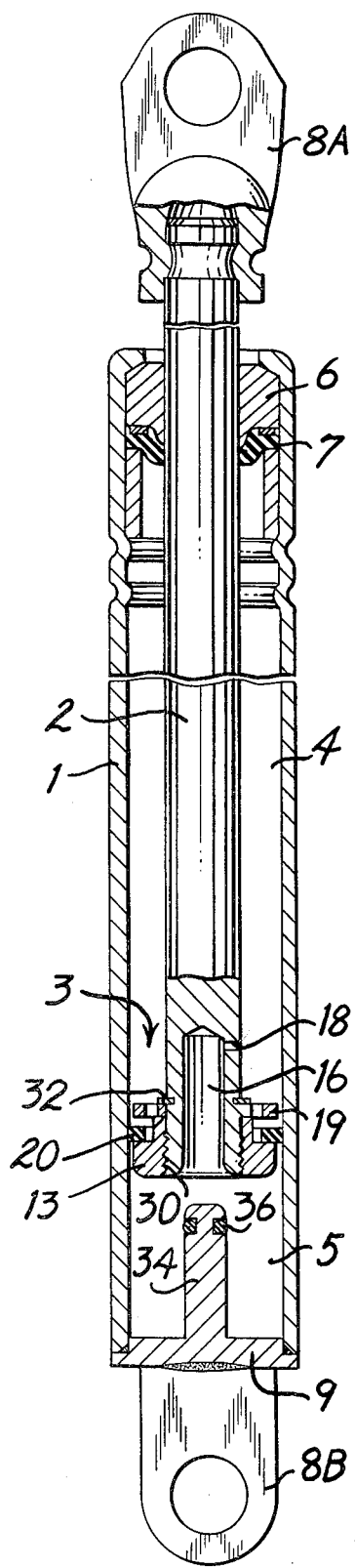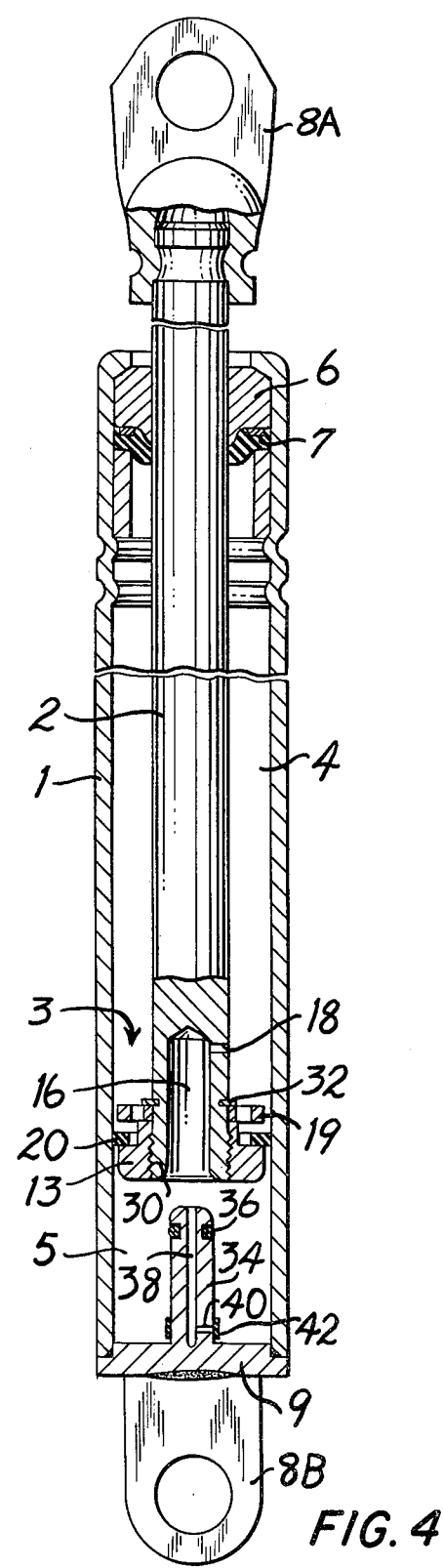

GAS SPRING WITH MEANS FOR IMPEDING PISTON MOVEMENT AWAY FROM ONE TERMINAL POSITION

CROSS REFERENCE TO RELATED APPLICATIONS

This application is a continuation-in-part of our co-pending U.S. application Ser. No. 938,228, filed Aug. 30, 1978, and now abandoned which is a division of U.S. application Ser. No. 791,011, filed Apr. 26, 1977, now U.S. Pat. No. 4,166,612 and repeats those portions of the disclosure and claims of the parent applications that relate to the divisional subject matter. The remaining portions of those applications are incorporated herein by reference.

BACKGROUND OF THE INVENTION

1. Field of the Invention

The invention relates generally to gas springs and like devices and particularly to improved devices of the piston-and-cylinder type in which the piston rod may be locked automatically at one end of its stroke against a force tending to expel the piston rod.

2. The Prior Art

Gas springs, which are devices of the type described, are employed between the body of a motor car or like vehicle and a cover, such as a hood, trunk lid, or door mounted on the body for movement about a horizontal axis. The fluid pressure in the spring tends to move the piston in a direction to expel the piston rod from the cylinder cavity and thereby to move the cover in an upward direction, whereby little or no manual effort is needed for lifting the cover. For downward movement of the cover, only the difference between the forces exerted on the cover by gravity and by the gas in the spring need to be overcome by hand. It is known to equip such gas springs with devices which impede movement of the piston rod from one of its axially terminal positions and thereby hold the cover in a lowermost angular position against the force of the gas in the spring independently of a latch or lock securing the cover directly to the vehicle body. In our earlier applications Ser. No. 938,228 now abandoned and Ser. No. 791,011, now U.S. Pat. No. 4,166,612 we have disclosed gas springs equipped with improved devices for accomplishing this function in a new and advantageous manner.

The present application is directed to the subject matter of our prior application Ser. No. 938,228 and to still further improvements therein having utility in gas springs and other devices of the piston-and-cylinder type referred to.

SUMMARY

In accordance with the invention, a piston-and-cylinder device includes a cylinder defining a sealed cavity therein and a piston assembly, including a piston and piston rod, partly received in the cavity and axially movable towards and away from a terminal position. The piston assembly is formed with a normally-open first passage which extends axially across the piston and connects the compartments of the cylinder cavity separated by the piston. The piston rod is fastened to the piston for joint movement and extends from the piston through one of the compartments and axially outward of the cylinder cavity. A valve arrangement defines a second passage extending between the compartments and responds to movement of the piston assembly away from the terminal position to close the second passage, while opening the same in response to assembly movement towards the terminal position. Locking structure carried in part by the cylinder and in part by the piston assembly closes off the first passage when the piston assembly approaches its terminal position, thereby permitting the piston assembly to be retained at the terminal position due to the action of the aforementioned valve arrangement in closing the second passage.

In one embodiment, the locking structure includes an open-ended plug on the cylinder which receives an extension on the piston assembly, when the piston assembly approaches and is at the terminal position, to close off the first passage between the cavity compartments. In a second embodiment, the piston assembly itself is open-ended, and the extension received therein at the terminal position of the piston assembly is in this instance carried by the cylinder. If desired, a third passage across the piston may be provided, with additional valve means being provided to open such passage upon the application to the piston rod of a predetermined force directed away from the terminal position of the piston assembly.

BRIEF DESCRIPTION OF THE DRAWINGS

Other features, additional objects and the attendant advantages of the invention will readily be appreciated as the same become better understood from the following detailed description of preferred embodiments when considered in connection with the appended drawings, in which:

FIGS. 2, 3 and 4 illustrate modifications of the spring of FIG. 1 in corresponding views.

DETAILED DESCRIPTION OF EXEMPLARY EMBODIMENTS

Figure 1:
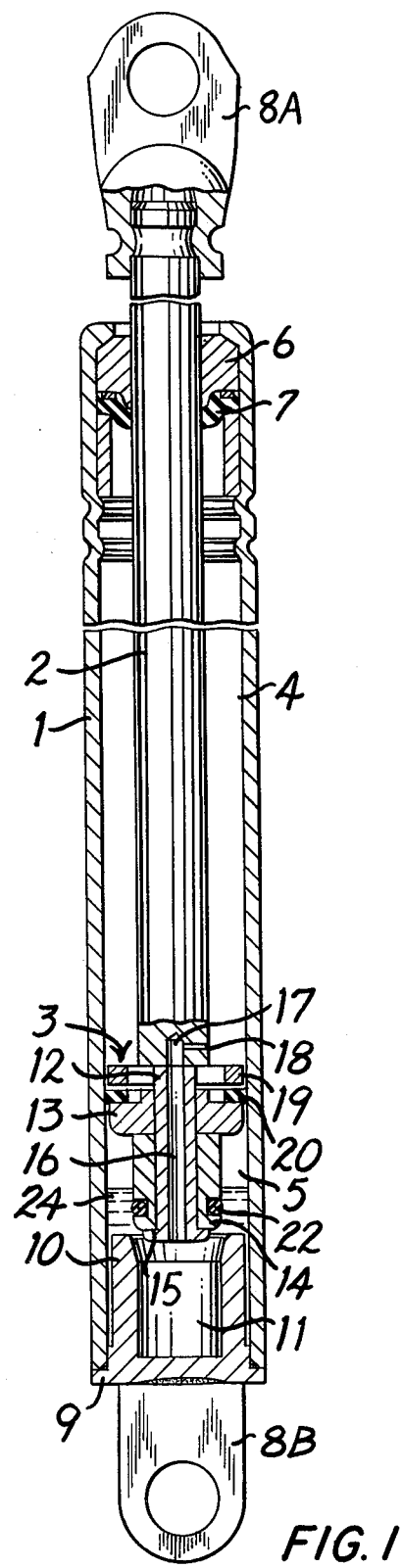
FIG. 1 shows a gas spring of the invention in elevational section on its axis.

Except for the reference numerals which have been changed in part herein for clarity of description, FIG. 1 corresponds to FIG. 6 of applicants' parent U.S. application Ser. No. 938,228 now abandoned and U.S. Pat. No. 4,166,612. The spring illustrated in FIG. 1 is of conventional external appearance. It has a cylinder 1 and a coaxial piston rod 2 extending axially outward of the cylinder through an annular, radial end wall 6 of the cylinder. An annular gasket 7 carried by the end wall 6 seals the cylinder cavity from the atmosphere, the other end wall of the cylinder being imperforate. The spring may be mounted between a vehicle body and a cover by means of fastening lugs 8A and 8B on the piston rod 2 and cylinder wall 9, respectively. As shown in FIG. 1, the gas spring is at or near its minimum overall length, and the piston rod 2 is at or near its innermost axial position within the cylinder 1, the inward stroke of the piston rod 2 being determined in part by the vehicle elements attached to the fastening lugs 8A and 8B.

A piston assembly 3, of which the piston rod 2 is a part, axially divides the cavity of the cylinder 1 into compartments 4, 5, respectively remote from and adjacent to the end wall 9. The piston assembly 3 is of the type disclosed in Schnitzius U.S. Pat. No. 3,919,509, the pertinent portions of which are hereby incorporated into this application, to provide controlled communication between the compartments 4, 5 through a restricted passage. Air or nitrogen at superatmospheric pressure is confined in the cylinder cavity and tends to expel the piston rod 2 at a velocity controlled by the rate of gas flow from the compartment 4 into the compartment 5. The structure described so far and its operation are too well known to require more detailed description.

The lower end wall 9 of the cylinder 1 is formed by a cup-shaped brake block or plug 10 which defines interiorly thereof a recess 11 that opens toward the compartment 5 in the illustrated intermediate position of the piston assembly 3. The piston assembly 3 includes a mounting tube 12 coaxially attached, e.g., by welding, to the inner end of the piston rod 2. An annular piston disk 13 and a tubular element 14 are coaxially secured on the tube 12 between a radial face of the disk 13 and a flange 15 of the tube 12. The external diameter of the element 14 is greater than the diameter of the piston rod 2. The flange 15 bounds an axially open orifice of the bore 16 in the tube 12 which, jointly with a short, coaxial bore 17 in the piston rod 2 and a radial throttling bore 18 in the piston rod, provides a first passage connecting the compartments 4, 5 in the illustrated position of the piston assembly.

The piston assembly 3 further includes a spider-mounted ring 19 fixedly secured between the piston rod 2 and a collar of the disk 13. The outer diameters of the disk 13 and the ring 19 are smaller than the inner diameter of the cylinder 1. A piston ring 20 is axially confined between the disk 13 and the ring 19 in frictional engagement with the cylinder 1 for limited movement between the illustrated position of abutting engagement with the ring 19, in which it seals the annular gap between the disk 13 and the cylinder 1, and a position of abutting engagement with the ring 19, in which the piston ring 20 opens a second passage connecting the compartments 4, 5. A sealing ring 22 projects radially from the tubular element 14 between the disk 13 and the flange 15. Hydraulic brake fluid 24 fills the lower portion of the compartment 5 and the interior space 11 in the plug 10. As already noted, the sealed cylinder cavity is otherwise filled with air or nitrogen under a pressure much higher than atmospheric pressure.

Fluid pressure in the connected compartments 4, 5 tends to expel the piston rod 2 from the cylinder 1. During the outward movement of the piston rod 2, friction engagement of the piston ring 20 with the cylinder 1 holds the piston ring against the disk 13. Outward piston rod movement is impeded by the throttling effect of the bore 18 on fluid flow between the compartments.

When the piston rod 2 is moved inward of the cylinder 1 by external forces, the ring 20 lags behind the disk 13 and a passage of relatively low flow resistance is opened through the gap between the disk 13 and the cylinder 1. Fluid may simultaneously flow between the compartments 4, 5 through the bores 16, 17 and 18. After the element 14 enters the space 11 in the plug 10, the sealing ring 22 is radially compressed and closes the passage between the compartment 5 and the space 11, which communicates with the compartment 4. As will be appreciated, this also closes off communication between the compartments 4 and 5 via the passage 16, 17, 18. Thereafter, fluid can be displaced from the space 11 only through the throttling bore 18, and there is a sudden, though small, increase in the resistance of the piston rod to inward movement. If the external force on the piston rod 2 is relaxed, the fluid pressure in the space 11 starts pushing the piston assembly 3 upward until the piston ring 20 engages the disk 13 and thereby seals the passage between the compartments 4 and 5 through the gap around the disk 13. The piston assembly 3 is thereby locked in its terminal position near the plug 10 in which the axial forces exerted by fluids in the compartments 4, 5 and the space 11 balance each other. The locking force, however, may be readily overcome by an outwardly directed force exerted on the piston rod 2 in the manner described in the referenced portions of parent application Ser. No. 938,228.

Figure 2:
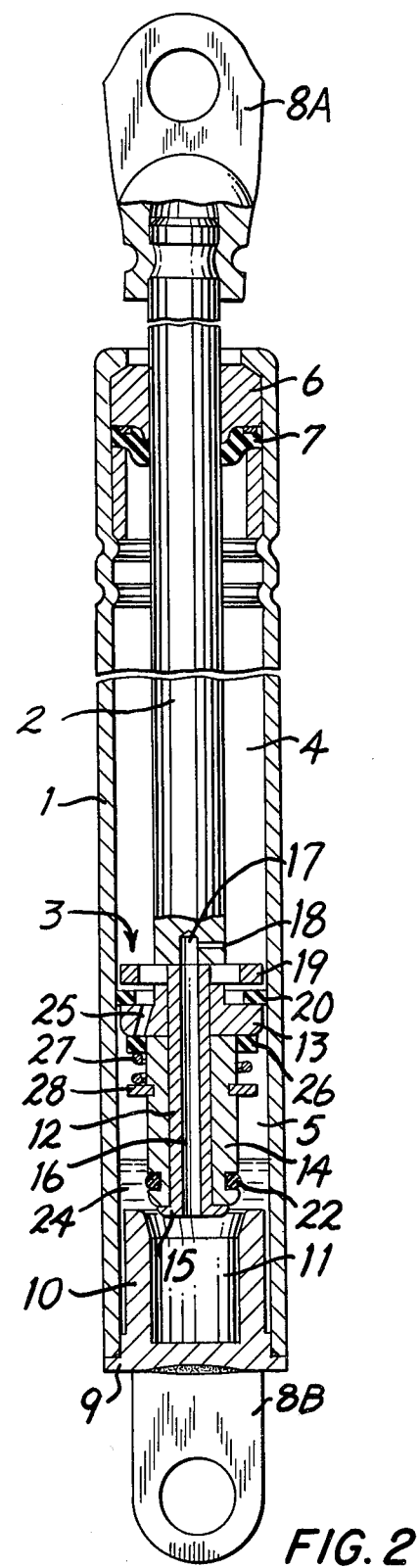

Except as otherwise noted the embodiment of FIG. 2 is the same as the embodiment of FIG. 1, and it will be understood that like reference numerals refer to like parts. As depicted in FIG. 2, the disk 13 has formed therein a plurality of circumferentially spaced, axially extending bores 25 (only one of which is shown) which communicate with the compartment 4 through the openings in the spider-mounted ring 19 and the central opening in the piston ring 20. The bores 25 are normally closed on the lower side thereof by a valve ring 26, which, as illustrated in FIG. 2, is biased towards the closed position by a helical compression spring 27 captured on the tubular element 14 by a spring clip 28. The operation of the embodiment of FIG. 2 is similar to that of FIG. 1. Thus the piston assembly 3 will be automatically locked at the inner terminal position in the manner described above in connection with FIG. 1.

Upon the application of an external force pulling the piston rod 2 outward of the cylinder 1, the resulting expansion of the compartment 5 and contraction of the compartment 4 causes a pressure differential between the two compartments which ultimately causes the valve ring 26 to open the bores 25 against the restraint of the spring 27, and the ensuing flow of fluid inward of the compartment 5 facilitates further withdrawal of the piston rod 2 until the sealing ring 22 is disengaged from the plug 10 and an additional passage between the compartments 4, 5 is opened via the bores 16, 17 and 18. As will be appreciated, the locking force of the device may be tailored to the requirements of specific applications by a spring 27 of appropriate strength.

The gas springs illustrated in FIGS. 3 and 4 are likewise basically the same in overall appearance and structure as the embodiment of FIG. 1, and, here again, like reference numerals as used to identify like parts. In these embodiments, however, the inner end of each cylinder rod 2 is tubular and externally threaded at 30 for engagement with an internally threaded annular piston disk 13. Also, the devices of FIGS. 3 and 4 are specially adapted for use with only a single operating fluid, either gaseous or liquid. No fluid interface is illustrated, therefore, in FIGS. 3 and 4. As in the prior embodiments, the disk 13 is smaller in diameter than the inner wall of the cylinder 1. An apertured, spider-mounted ring 19, also of smaller diameter than the cylinder wall, is captured between a shoulder on the disk 13 and a spring clip 32 on the piston rod 2. As will be understood, the ring 19 limits axial shifting of the piston ring 20 in an upward direction away from the disk 13. The compartments 4, 5 on axially opposite sides of the disk 13 are connected in the illustrated position of the piston assembly 3 by a first passage through a wide axial bore 16 and a relatively wide radial bore 18 in the piston rod 2. A second passage connecting the compartments 4, 5 via the gap around the disk 13 is opened by the piston ring 20 acting as a valve when the piston assembly moves inward of the cylinder 1.

As illustrated in FIGS. 3 and 4, the end wall 9 includes a cylindrical projection 34 that extends into the compartment 5 in coaxial alignment with the large bore 16 in the piston rod 2, and in both embodiments carries a sealing ring 36 adjacent its free end. When the piston assembly 3 is moved downward from the position illustrated in FIGS. 3 and 4 against the restraint of a compressed fluid filling the cylinder cavity, the rod 34 enters the bore 16 and the sealing ring 36 closes the passage 16, 18 between the compartments 4, 5 through the piston rod 2. Fluid trapped below the piston disk 13, however, can continue to flow to the compartment 4 through the annular gap between the disk 13 and the inner cylinder wall, which is opened by the piston ring 20 during movement of the piston rod 2 inward of the cylinder cavity. When the inward force applied to the piston rod 2 is relaxed, the disk 13 is moved slightly upward into sealing engagement with the stationary piston ring 20, and the piston assembly 3 is thus locked near its lowermost position in pressure equilibrium between the bodies of fluid in the compartments 4, 5.

The embodiment of FIG. 4 differs from that of FIG. 3 in that the projection 34 on the end wall 9 is formed with an upwardly open, axial bore 38 and a radial bore 40 which connects the lower end of the axial bore 38 to the compartment 5. An annular rubber seal member 42 normally closes the orifice of the radial bore 40 in the cylindrical face of the projection 34.

When the piston rod 2 is pushed inward of the cylinder 1, the rod 34 enters the bore 16 in the piston rod 2 as described with reference to FIG. 3 to close the passage between the compartments 4, 5 through the piston rod 2. If the piston rod 2 thereafter is pulled outward of the cylinder 1, a pressure differential between the compartments 4, 5 causes the rubber seal member 42 to be pushed away from the orifice of the radial bore 40, thereby opening a by-pass which facilitates disengagement of the rod 34 from the piston rod 2 until the sealing ring 36 is disengaged from the wall of the bore 16. As will be appreciated, therefore, the embodiment of FIG. 3 operates in basically the same manner as the embodiment of FIG. 1, while the embodiment of FIG. 4 operates like that of FIG. 2.

The terms "upper" and "lower" and analogous terms have been used with reference to the drawing for convenient description of what is illustrated. If a cylinder 1 is partly filled with liquid and partly with gas, it is preferred that the terminal, locked position be reached when the piston assembly 3 is in or contiguously adjacent its lowest position relative to the cylinder. When only one fluid, gaseous or liquid, is employed, as shown for example in FIGS. 3 and 4, gravity has no effect on operation, and the piston-and-cylinder device may be mounted in any desired orientation in space.

The projections 34 in the embodiments of FIGS. 3 and 4 make it impractical for the piston rod to extend from the disk 13 outward of the cylinder cavity through the compartment 5. In the device of FIGS. 2 and 3, however, the piston rod 2 may if desired be attached to the flanged end of the tubular element 12 without blocking the orifice of the bore 16 and extend outward of the cylinder cavity through a gasketed opening in the end plug 10 while the annular end wall 6 is sealed and carries the mounting lug 8B. The bore 16 would then communicate directly with the compartment 4, and in such case its orifice may be reduced in size to duplicate the afore-described throttling effect of the radial bore 18.

Other variations of the illustrated embodiments of the invention will readily suggest themselves on the basis of the above teachings. For example, if a spring action is not needed but the locking function is to be maintained, another rod, equal in cross section to the piston rod 2, may be mounted coaxially on the tubular element 12 in the embodiments of FIGS. 1 and 2 for movement through an aperture in the plug 10 and a suitable gasket without blocking the orifice of the bore 16. In this case, the plug 10 could be moved to another suitable location within the cylinder 1. In this modified piston-and-cylinder device, liquid may completely replace the compressed nitrogen in the cylinder 1. It should be understood, therefore, that the foregoing disclosure relates only to presently preferred embodiments, and that it is intended to cover all changes and modifications of the examples of the invention herein chosen for the purpose of the disclosure which do not constitute departures from the spirit and scope of the invention set forth in the appended claims.

What is claimed is:

1. A cylinder-and-piston device, comprising:
   (a) a cylinder having an axis and defining a sealed cavity therein;
   (b) a piston assembly axially movable in said cavity towards and away from a terminal position, and including:
      (1) a piston axially dividing said cavity into first and second compartments;
      (2) means defining a first passage extending axially across said piston for connecting said compartments when said assembly is remote from said terminal position;
      (3) a piston rod fastened to said piston for joint movement therewith and extending from the piston through said first compartment and axially outward of said cavity;
      (4) means defining a second passage extending axially across said piston for connecting said compartments; and
      (5) valve means for closing said second passage, said valve means operating to close said second passage only in response to movement of said piston assembly away from said terminal position, said valve means opening said second passage in response to movement of said piston assembly towards said terminal position; and
   (c) locking means carried in part by said cylinder in said cavity and in part by said piston assembly for closing said first passage when said piston assembly approaches said terminal position so that once said piston assembly is adjacent said terminal position, movement of said piston assembly away from said terminal position closes said second passage, thereby preventing fluid communication between said first and second compartments and thereby retaining said piston assembly adjacent said terminal position.

2. A device as set forth in claim 1, further comprising a fluid under superatmospheric pressure in at least one of said compartments.

3. A device, as set forth in claim 2, wherein said locking means is operative to maintain said first passage closed while said piston assembly is adjacent said position and to permit fluid flow through said first passage when said piston assembly is remote from said position.

4. A device as set forth in claim 1, wherein said locking means includes a tubular extension on said piston assembly projecting from said piston into said second compartment, said tubular portion being formed with an orifice of said first passage, said locking means sealing said orifice from said second compartment when said piston assembly is adjacent said position.

5. A device as set forth in claim 4, wherein said locking means defines a chamber communicating with said second compartment when said piston assembly is remote from said position and communicating with said orifice in all positions of said piston assembly, said locking means sealing said chamber from said second compartment when said piston assembly is in said position thereof.

6. A device as set forth in claim 1, wherein said first passage has an axially open orifice in said piston assembly, and said locking means sealingly engages said orifice when said piston assembly approaches said position.

7. A device as set forth in claim 6, wherein said locking means includes a locking member dimensioned for axial movement inward of said passage through said orifice.

8. A device as set forth in claim 1, wherein said locking means includes pressure relief valve means responsive to a sufficient force applied axially to said piston assembly for moving the assembly in a direction away from said position for opening a third passage connecting said compartments while said first and second passages are closed.

9. A device as set forth in claim 8, wherein said piston assembly is formed with said third passage.

10. A device as set forth in claim 1, wherein said terminal position is that position in which said first compartment has its greatest volume and said second compartment has its smallest volume.

11. A cylinder-and-piston device, comprising:
 (a) a cylinder having an axis and defining a sealed cavity therein;
 (b) a piston assembly axially movable in said cavity between two axially terminal positions, said assembly including
  (1) piston means axially dividing said cavity into two compartments, and
  (2) a piston rod fastened to said piston means for joint movement, said piston rod extending axially from said piston through one of said compartments and outward of said cavity;
 (c) locking means for impeding axial movement of said piston away from one of said terminal positions thereof, said locking means including:
  (1) a plunger member fastened to said piston for joint movement and axially projecting from said piston into the other compartment,
  (2) a locking member axially secured to said cylinder in said other compartment and formed with an axially open recess receiving said locking member in said one terminal position of said piston, and
  (3) cooperating engagement means on said members impeding relative axial movement of said members when said plunger member is received in said recess; and
 (d) fluid in said compartments,
  (1) said piston assembly and said plunger being formed with respective portions of a first passage having respective orifices in said one compartment and in said recess when plunger member is received in said recess,
  (2) said piston bounding a second passage connecting said compartments,
  (3) said locking means further including valve means closing said second passage in response to incipient movement of said piston away from said one terminal position thereof,
  (4) said first passage constituting the sole connection between said other compartment and said one compartment when said valve means closes said second passage and said plunger member is received in said recess.

12. A device as set forth in claim 11, wherein said engagement means includes a resiliently compressible sealing element on one of said members sealing said recess from a portion of said other compartment adjacent said piston in said one terminal position of said piston.

13. A device as set forth in claim 12, wherein said second passage extends radially between said piston and said cylinder, and said valve means includes a valve member mounted on said piston for axial movement between a passage-closing and a passage-opening position, said valve member slidably engaging said cylinder.

14. A device as set forth in claim 13, wherein said first passage is permanently open and includes a portion of restricted flow section.

15. A device as set forth in claim 14, wherein said piston has respective, annular face portions in said compartments about said piston rod and about said plunger member, respectively, the area of the face portion in said one compartment being greater than the area of the face portion in said other compartment.

16. A device as set forth in claim 11, wherein said fluid includes an amount of liquid sufficient to fill said first passage and said other compartment when said plunger member is received in said recess.

17. A device as set forth in claim 11, wherein said one terminal position is that in which said one compartment has its greatest volume and said other compartment has its smallest volume.

18. A cylinder-and-piston device adapted so as to be mounted between a mass and a movable object attached to said mass for movement between a lower terminal position and an upper terminal position, said cylinder-and-piston device tending to bias said movable object toward said upper terminal position, and tending to retain said movable object adjacent said lower terminal position in the absence of an external force, the improvement wherein said cylinder-and-piston device comprises:
 (a) a cylinder having an axis and defining a sealed cavity therein;
 (b) a piston assembly axially movable in said cavity toward and away from a terminal position corresponding to said lower terminal position of said movable object, and including:
  (1) a piston axially dividing said cavity into first and second compartments;
  (2) means defining a first passage extending axially across said piston for connecting said compartments when said assembly is remote from said terminal position;
  (3) a piston rod fastened to said piston for joint movement therewith and extending from the piston through said first compartment and axially outward of said cavity;
  (4) means defining a second passage extending axially across said piston for connecting said compartments; and
  (5) valve means for closing said second passage, said valve means operating to close said second passage only in response to movement away from said terminal position, said valve means opening said second passage in response to movement of said piston assembly towards said terminal position; and (c) locking means carried in part by said cylinder in said cavity and in part by said piston assembly for closing said first passage when said piston assembly approaches said terminal position so that once said piston assembly is adjacent said terminal position, movement of said piston assembly away from said terminal position closes said second passage to prevent fluid communication between said first and second compartments, thereby retaining said piston assembly adjacent said terminal position and said movable object adjacent said lower terminal position.

* * * * *